United States Patent
Ho

[19]

[11] Patent Number: 5,839,804
[45] Date of Patent: Nov. 24, 1998

[54] COMPUTER MAINFRAME HOUSING

[76] Inventor: Hsin Chien Ho, 20F-1, 268, Sec. 1, Wen-Hua Road, Pan Chiao City, Taipei, Taiwan

[21] Appl. No.: 898,404

[22] Filed: Jul. 22, 1997

[51] Int. Cl.[6] .................................................... H05K 5/00
[52] U.S. Cl. .................................... 312/223.2; 312/265.6
[58] Field of Search ............................. 312/223.2, 223.1, 312/257.1, 263, 265.5, 265.6; 361/818, 679; 220/4.02, 4.21, 784, 324; 292/253; 174/35 R, 356 C

[56] References Cited

U.S. PATENT DOCUMENTS

| | | | |
|---|---|---|---|
| 4,966,302 | 10/1990 | Hjordie | 220/784 X |
| 5,013,105 | 5/1991 | Rossum, Jr. | 312/257.1 X |
| 5,164,886 | 11/1992 | Chang | 312/257.1 X |
| 5,383,098 | 1/1995 | Ma et al. | 220/4.02 X |
| 5,392,192 | 2/1995 | Dunn et al. | 174/35 GC |
| 5,420,760 | 5/1995 | Ansell et al. | 174/35 GC |
| 5,434,747 | 7/1995 | Shibata | 174/35 R |

*Primary Examiner*—Jose V. Chen
*Assistant Examiner*—Janet M. Wilkens
*Attorney, Agent, or Firm*—Bacon & Thomas, PLLC

[57] ABSTRACT

A computer mainframe housing includes a metal casing having two retainer blocks at two opposite sides and a rear flange, a plastic cover covered on the metal casing and internally covered with a metal sheet for protection against electromagnetic interference, the plastic cover having two handles respectively protecting from two split side wall portions thereof at two opposite sides, two retainer blocks respectively protecting from the split side wall portions and controlled by the handles to be forced into engagement with the retainer blocks of the metal casing, and a plurality of top rods protecting from the inside of the cover to engage the front of a rear flange of the metal casing.

2 Claims, 2 Drawing Sheets

COMPUTER MAINFRAME HOUSING

BACKGROUND OF THE INVENTION

The present invention relates to a computer mainframe housing, and more specifically to such a computer mainframe housing which is made up of a metal casing and, plastic cover served to the metal casing without the use of any external fastening elements and that has an inside wall covered with a metal sheet for protection against electromagnetic interference.

A conventional computer mainframe housing is generally made up of a metal casing, a face panel and a metal cover fitted on the metal casing and fastened thereto by fastening elements for example screws. The procedure of fastening the metal cover to the metal casing by screws is complicated.

SUMMARY OF THE INVENTION

It is one object of the present invention to provide a computer mainframe housing that can be quickly assembled by hand without the use of any external fastening elements. It is another object of the present invention to provide a computer mainframe housing which is inexpensive to manufacture. According to the preferred embodiment of the present invention, the computer mainframe housing includes a metal casing having two retainer blocks at two opposite sides and a rear flange, a plastic cover that covers on the metal casing and is internally covered with a metal sheet for protection against electromagnetic interference, the plastic cover having two handles respectively projecting from two split side wall portions thereof at two opposite sides, two retainer blocks respectively projecting from the split side wall portions and controlled by the handles to be forced into engagement with the retainer blocks of the metal casing, and a plurality of top rods projecting from the inside of the cover to engag the front of a rear flange of the metal casing.

DETAILED DESCRIPTION OF THE PREFERRED EMBODIMENT

Figure 1:
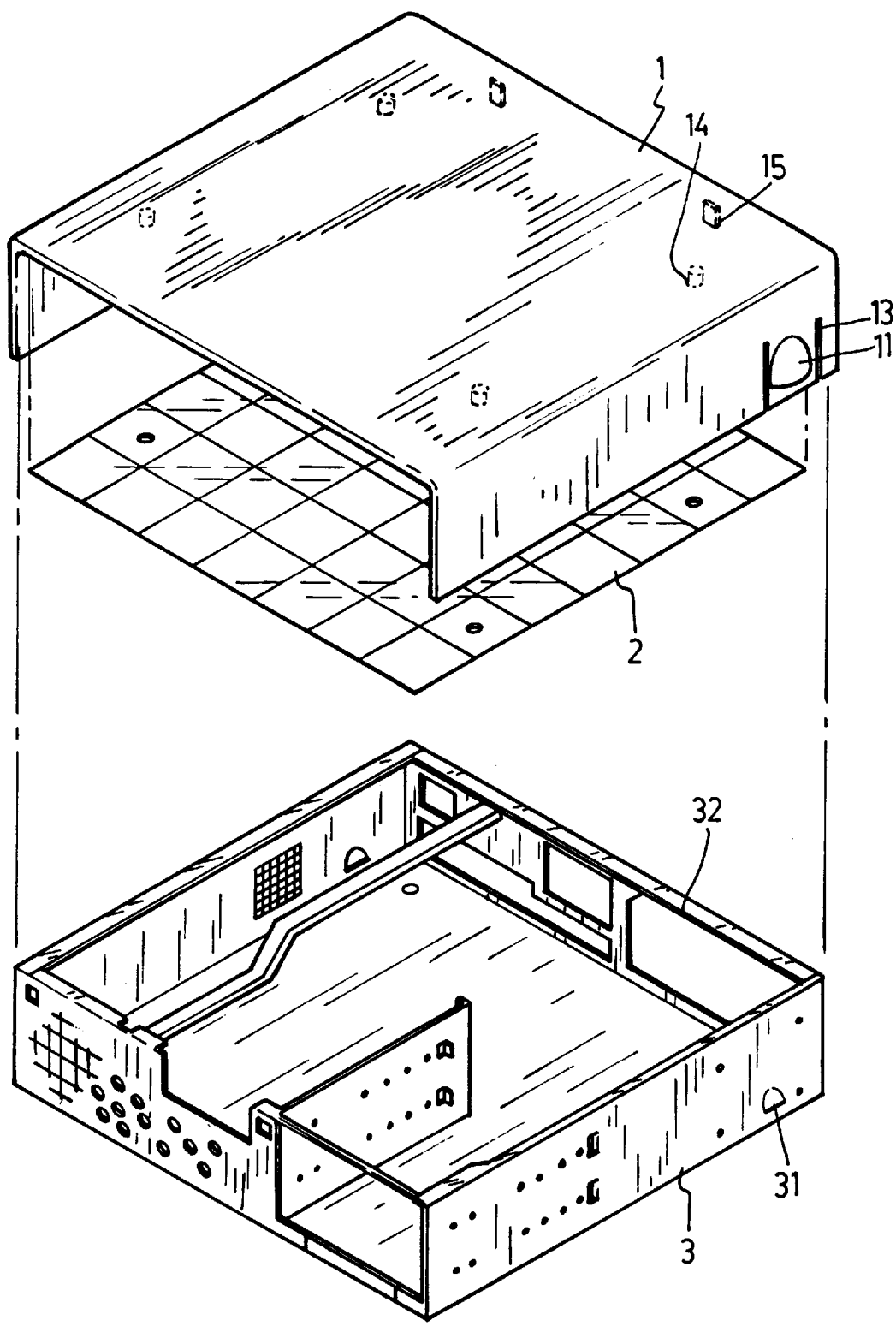
FIG. 1 is an exploded view of a computer mainframe housing according to the present invention.
Figure 2:
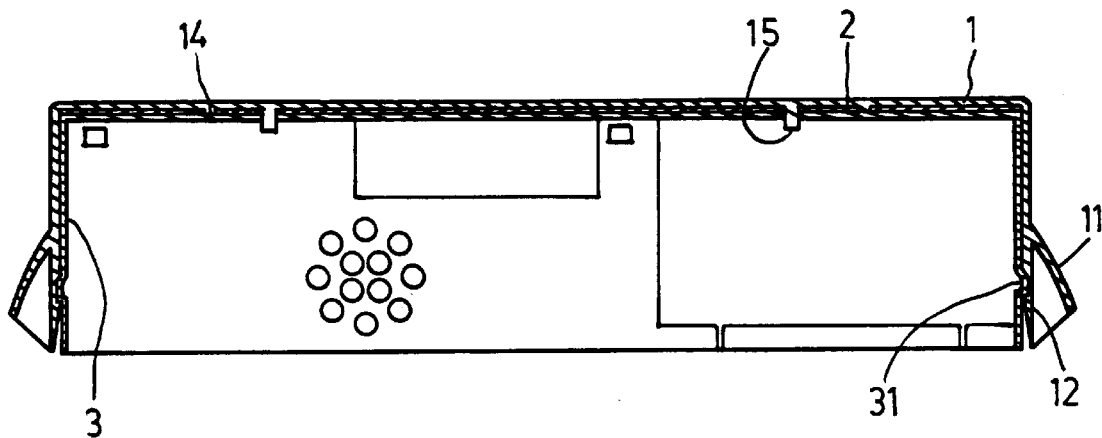
FIG. 2 is a sectional assembly view of the computer mainframe housing shown in FIG. 1.
Figure 3:
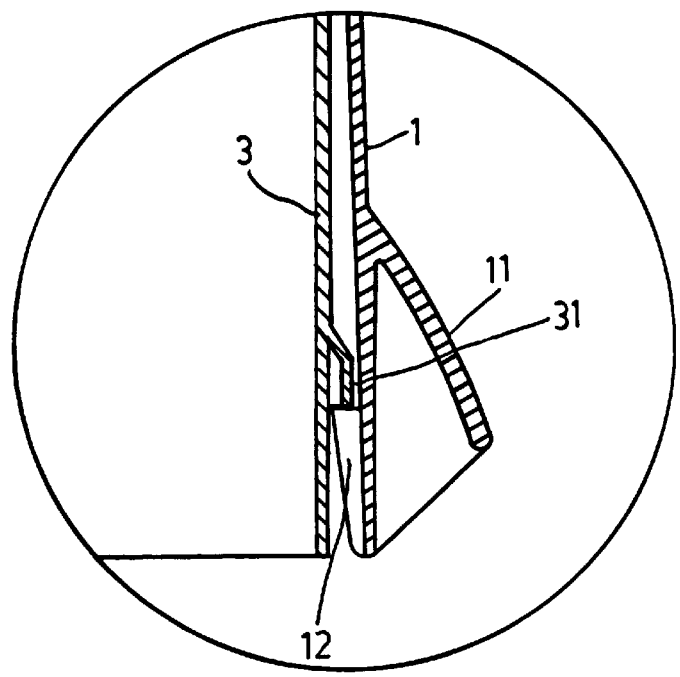
FIG. 3 is an enlarged view of a part of FIG. 2, showing the engagement between the retainer block of the casing and the retainer block of the top cover.

Referring to FIGS. 1, 2 and 3, a mainframe housing for a computer in accordance with the present invention includes of a substantially rectangular casing 3, and a top cover 1 having a substantially U-shaped cross section fitted on the casing 3. The top cover 1 is molded from plastic having a horizontal top wall and two vertical side walls respectively extended from two opposite lateral sides of the horizontal top wall at right angles, a plurality of downward locating pins 14 downwardly projecting from its top wall and a plurality of stop rods 15 downwardly projecting from its top wall and arranged in a line along its rear side, two handles 11 projecting from two opposite vertical side walls on the outside of the cover, two pairs of downwardly extended vertical slits 13 respectively made in two opposite vertical side walls of the cover at two opposite sides of each handle 11 that enable the handles 11 to be respectively pulled outwards, and two retainer blocks 12 projecting inwardly from the two opposite vertical side walls on the inside of the walls corresponding to the handles 11. A metal sheet 2 covers the bottom side of the top wall of the top cover 1 and is secured in place by the downward locating pins 14 for protection against electromagnetic interference. The casing 3 is made from metal and includes two retainer blocks 31 projecting from its two opposite vertical side walls, and a rear top flange 32 extending from the topmost edge of its vertical rear wall.

Referring to FIGS. 2 and 3 again, after the metal sheet 2 and the top cover 1 have been secured together, the top cover 1 is fitted on the casing 3 by pulling the handles 11 bilaterally outwards to permit the retainer blocks 12 of the top cover 1 to pass downwardly over the retainer blocks 31 of the casing 3. When installed, the handles 11 are released from the hands, and the retainer blocks 31 of the casing 3 are retained in engagement with the retainer blocks 12 of the top cover to stop the top cover 1 from upward movement relative to the casing 3, and the downward stop rods 15 of the top cover 1 engaging the front of the rear top flange 32 of the casing 3 to prohibit the top cover 1 from backward movement relative to the casing 3.

While only one embodiment of the present invention has been shown and described, it will be understood that various modifications and changes could be made thereunto without departing from the spirit and scope of the invention disclosed. For example, the mainframe housing can be made for a vertical personal computer.

What the invention claimed is:

1. A computer mainframe housing comprising:

a metal casing having an opening at one side, first and second retainer blocks respectively projecting outwardly from two opposite lateral side walls of the casing at two opposite sides of said opening, and a rear flange projecting forwardly from a rear wall of the casing;

a plastic cover having a top wall arranged to cover the opening of said metal casing, two opposite lateral side walls respectively extending from two opposite sides of the top wall of the cover at right angles, a plurality of stop rods extending from the top wall of the cover, two handles respectively projecting outwardly from the two opposite lateral side walls of the cover, two pairs of slits, one pair of slits being respectively formed in each of the two opposite lateral side walls, with the slits of each pair being formed at two opposite sides of each of said handles to enable movable sections of said opposite lateral side walls of said cover, together with said handles, to be respectively pulled outwards, and third and fourth retainer blocks respectively projecting inwardly from said movable sections of said opposite lateral side walls of said cover, wherein said third and fourth retainer blocks respectively engage said first and second retainer blocks to secure the plastic cover to the metal casing, and wherein when said movable sections and handles are pulled outwards, the third and fourth retainer blocks are also moved outwards, at which point the third and fourth retainer blocks disengage the first and second retainer blocks to enable the plastic cover to be removed from the metal casing.

2. The computer mainframe housing of claim 1, wherein said casing is made for a horizontal personal computer.

* * * * *